(12) United States Patent
Tsukada et al.

(10) Patent No.: US 11,350,000 B2
(45) Date of Patent: May 31, 2022

(54) IMAGE PROCESSING APPARATUS, CONTROL METHOD OF THE SAME, AND STORAGE MEDIUM

(71) Applicant: CANON KABUSHIKI KAISHA, Tokyo (JP)

(72) Inventors: Yoshihiro Tsukada, Ibaraki (JP); Hikaru Sugita, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/094,282

(22) Filed: Nov. 10, 2020

(65) Prior Publication Data

US 2021/0144266 A1 May 13, 2021

(30) Foreign Application Priority Data

Nov. 13, 2019 (JP) .............................. JP2019-205592

(51) Int. Cl.
*H04N 1/00* (2006.01)
*H04N 1/04* (2006.01)

(52) U.S. Cl.
CPC ..... *H04N 1/00241* (2013.01); *H04N 1/00244* (2013.01); *H04N 1/00411* (2013.01); *H04N 1/04* (2013.01)

(58) Field of Classification Search
CPC .. H04N 1/00241; H04N 1/04; H04N 1/00411; H04N 1/00244; H04N 1/00137; H04N 1/00151; H04N 1/00204; H04N 1/00209; H04N 1/00212; H04N 1/00233; H04N 1/00408; H04N 1/00477; H04N 1/32144; H04N 1/3263; H04N 1/32635; H04N 1/32662; H04L 67/02; H04L 67/22; H04L 67/306; H04L 51/02; H04L 51/046; H04L 51/18; H04L 12/1813; H04L 12/1895; H04L 51/04; H04L 51/08;
(Continued)

(56) References Cited

U.S. PATENT DOCUMENTS

| | | | |
|---|---|---|---|
| 6,493,878 B1* | 12/2002 | Kassatly | H04N 9/0451 725/144 |
| 7,330,610 B2* | 2/2008 | Tang | G06F 9/4401 382/217 |
| 8,315,481 B2* | 11/2012 | Hayashi | H04N 19/20 382/299 |
| 10,986,057 B2* | 4/2021 | Taylor | H04L 67/306 |

(Continued)

FOREIGN PATENT DOCUMENTS

EP 2986008 A1 2/2016
JP 2019062353 A 4/2019

*Primary Examiner* — Negussie Worku
(74) *Attorney, Agent, or Firm* — Canon U.S.A., Inc. IP Division

(57) ABSTRACT

In order to achieve designation of a talk room of a chat service to share image data generated by scanning in an image processing apparatus, the image processing apparatus that communicates with a chat server, based on received information indicating a talk room of the chat server, the chat server controlling displaying of information indicating received image data on the talk room, includes a scanning unit configured to scan an image of an original document and generate image data based on the image, a designation unit configured to designate a talk room of the chat server, and a transmission unit configured to transmit the image data generated by the scanning unit and information indicating the talk room designated by the designation unit to the chat server.

32 Claims, 17 Drawing Sheets

(58) Field of Classification Search
CPC ......... H04L 51/10; H04L 51/16; H04L 51/20; H04L 51/24; H04L 67/06; G06F 16/9535; G06F 16/954; G06F 16/958; G06F 1/3231; G06F 1/324; G06F 1/3287; G06F 1/3296; G06F 2203/04803; G06F 3/012; G06F 3/013; G06F 3/0304; G06F 3/0481; G06F 3/0484; G06F 3/0488; G06F 3/04883; G06F 3/04886; G06F 3/0489; G06F 3/1454; G06F 3/147; G06Q 10/10; G06Q 10/107; G06T 3/4092; G09G 2340/10; G09G 2340/12; G09G 2340/14; G09G 2358/00
USPC .......................................................... 358/1.1
See application file for complete search history.

(56) References Cited

U.S. PATENT DOCUMENTS

| | | | |
|---|---|---|---|
| 2002/0091770 A1* | 7/2002 | Takakura | G06F 16/958 709/205 |
| 2003/0122954 A1* | 7/2003 | Kassatly | H04N 9/0451 348/335 |
| 2013/0021640 A1 | 1/2013 | Tamura | |
| 2014/0063562 A1 | 3/2014 | Lee et al. | |
| 2014/0165104 A1* | 6/2014 | Choi | H04N 21/4383 725/40 |
| 2020/0099800 A1* | 3/2020 | Noguchi | H04N 1/32662 |
| 2020/0213455 A1* | 7/2020 | Ogino | H04N 1/00233 |
| 2020/0236228 A1* | 7/2020 | Awatsu | H04N 1/00151 |
| 2020/0304436 A1* | 9/2020 | Maruyama | H04L 12/1813 |
| 2021/0055897 A1* | 2/2021 | Tomihisa | H04L 51/02 |
| 2021/0195060 A1* | 6/2021 | Hasegawa | H04N 1/00411 |

\* cited by examiner

FIG.15B

715 — 714 Scan-to-Chat

Channel Setting

- ☐ channel 1 ▽
- ☐ channel 2 ▽
- ■ channel 3 △
  - ■ user 1
  - ☐ user 2
  - ☐ user 3

◆ Status Check

Transmission Setting

712 Scan-to-Chat

| Posting Destination: channel 3 @user 1 | Destination Check: One |
| Destination Setting \| Transmission Setting | ✎ Reset |
| Readout Size: A4 | ◆ Monochrome Start |
| 717 — File Format: PDF | |
| Title: Test Transmission | ◆ Color Start |
| Title: Test Transmission File Name: Document | ◆ Status Check |

FIG.16

| DEVICE ID/USER ID | AUTHENTICATION INFORMATION (TOKEN) |
|---|---|
| user1 | xx token 1 |
| user2 | xx token 2 |
| user3 | xx token 3 |
| device1 | xx token 4 |
| device2 | xx token 5 |

IMAGE PROCESSING APPARATUS, CONTROL METHOD OF THE SAME, AND STORAGE MEDIUM

BACKGROUND OF THE INVENTION

Field of the Invention

The present disclosure relates to an image processing apparatus, a control method of the image processing apparatus, and a storage medium.

Description of the Related Art

Japanese Patent Application Laid-Open No. 2019-62353 discusses an image processing apparatus that transmits image data, which is generated by scanning an image of an original document, to a file server on a network to share the generated image data.

SUMMARY OF THE INVENTION

In a case where a user uses a chat service released on the Internet to share image data, which is generated by scanning, in a talk room of the chat service, there is an issue described below. For example, as discussed in Japanese Patent Application Laid-Open No. 2019-62353, from image processing apparatuses which transmit generated image data to a file server using server message block (SMB) communication or the like, a talk room of a chat service cannot be designated, and thus users cannot share image data in a desired talk room.

The present disclosure has been made in consideration of the above issue, and is directed to designating a talk room of a chat service to share image data generated by scanning in an image processing apparatus.

According to an aspect of the present disclosure, an image processing apparatus that communicates with a chat server, based on received information indicating a talk room of the chat server, the chat server controlling displaying of information indicating received image data on the talk room, the image processing apparatus includes a scanning unit configured to scan an image of an original document and generate image data based on the image, a designation unit configured to designate a talk room of the chat server, and a transmission unit configured to transmit the image data generated by the scanning unit and information indicating the talk room designated by the designation unit to the chat server.

Further features of the present disclosure will become apparent from the following description of exemplary embodiments with reference to the attached drawings.

BRIEF DESCRIPTION I/F THE DRAWINGS

FIGS. 15A and 15B are diagrams illustrating an example of screen transition in the scan-to-chat processing.

FIG. 16 is a diagram illustrating an example of correspondence between identification (ID) and token information.

DESCRIPTION OF THE EMBODIMENTS

Exemplary embodiments to implement the present disclosure will be described below with reference to the accompanying drawings. Configurations of the exemplary embodiments described below are merely examples, and the present disclosure is not limited to the illustrated configurations.

First Exemplary Embodiment

Figure 1:
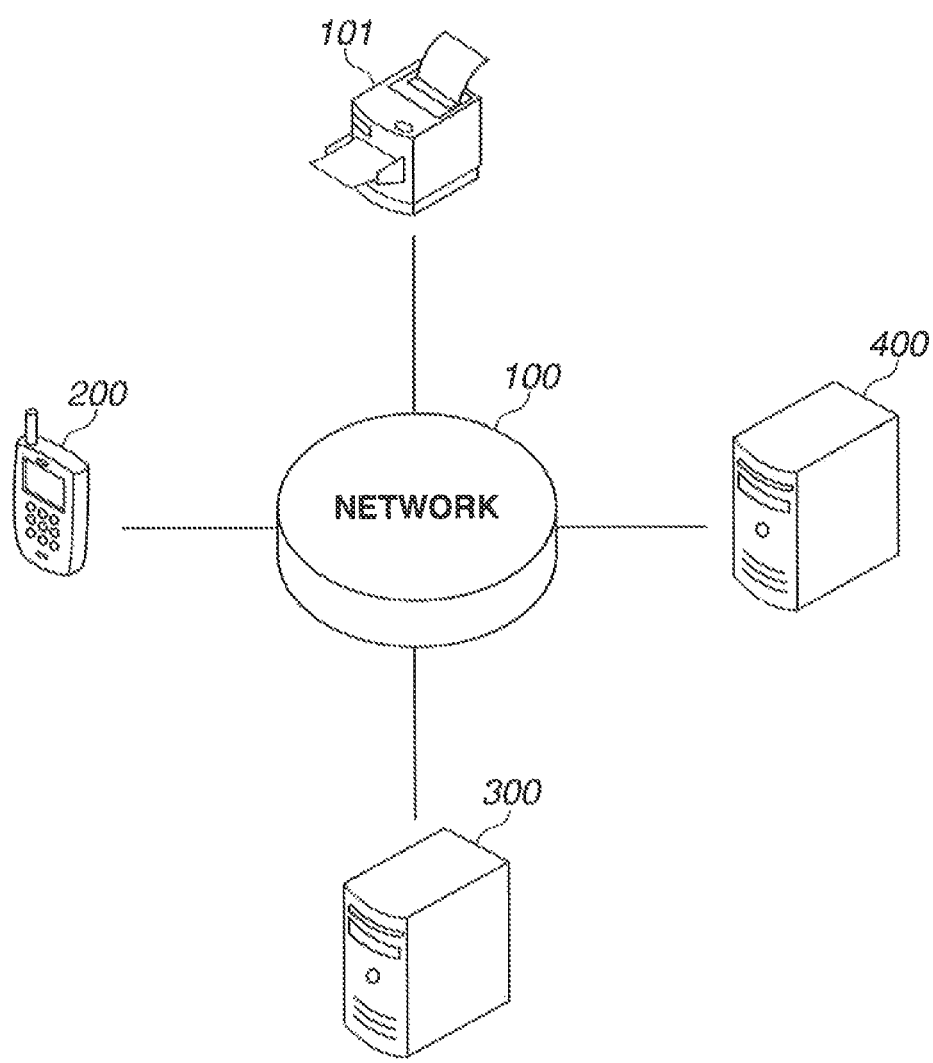
FIG. 1 is a diagram illustrating a system configuration example according to the present disclosure.

FIG. 1 is a diagram illustrating a system configuration example according to the present disclosure. The system according to a first exemplary embodiment includes a multifunction peripheral (MFP) 101 and a message application server 300. The MFP 101 is an image processing apparatus that can communicate with a mobile terminal 200, which is an example of a terminal apparatus, via a network 100. A bot server 400 is also connected to the system via the network 100 and capable of communicating with the apparatuses connected to the system. The message application server 300 is a chat server that manages a chat service to receive a message and/or image data transmitted from the MFP 101 and the mobile terminal 200, and displays the message and/or the image data on the mobile terminal 200 or a personal computer (PC) (not illustrated) by a user operation. The bot server 400 performs linking between the MFP 101 and information (token information) corresponding to a bot application installed in the message application server 300 to be connected to the MFP 101, and forwards a request from the MFP 101 to the message application server 300. The network 100 according to the present exemplary embodiment may be the Internet, or a local area network (LAN). The network 100 may be a wired network or a wireless network.

Figure 2:
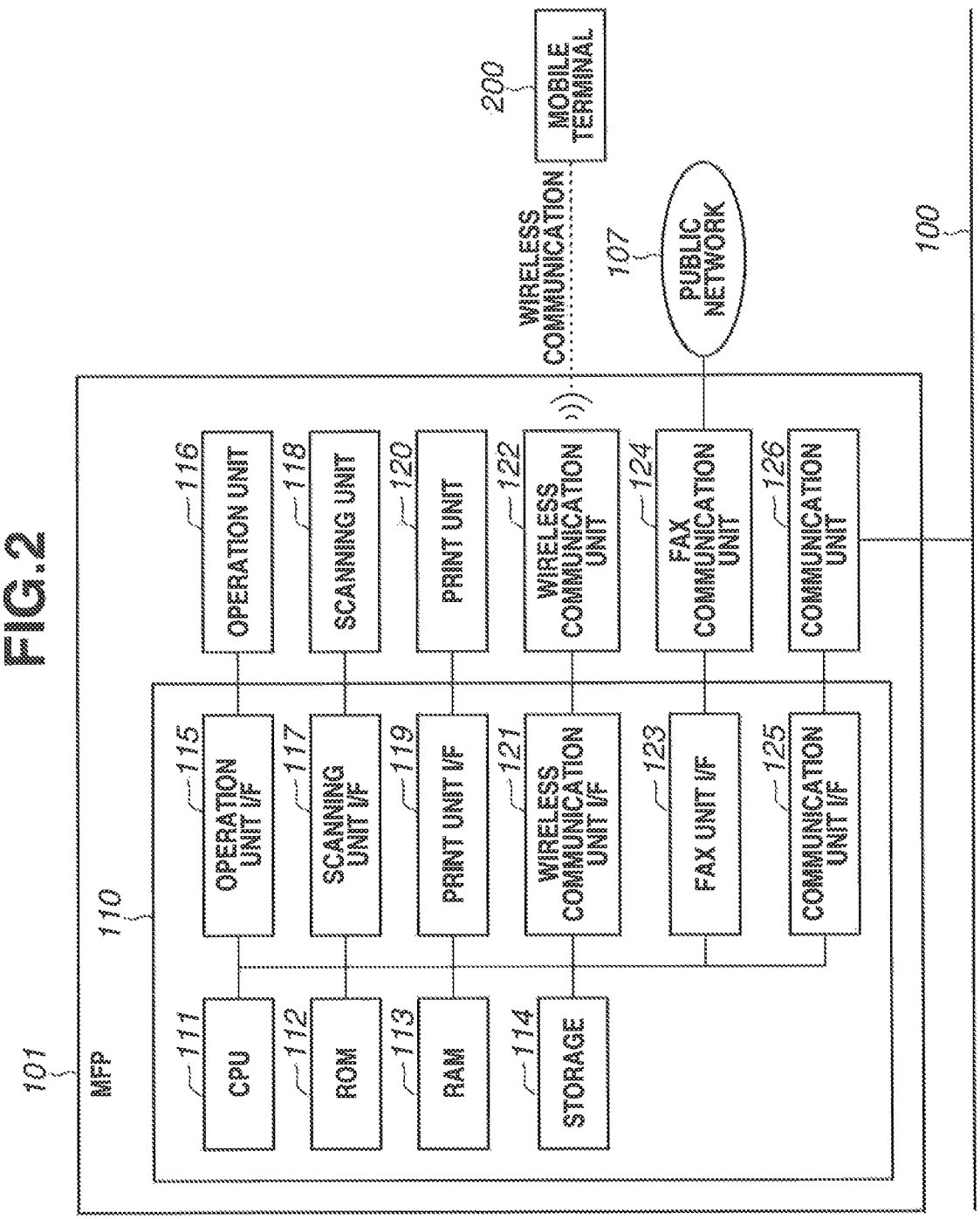
FIG. 2 is a diagram illustrating a hardware configuration example of a multifunction peripheral (MFP) 101.

FIG. 2 is a diagram illustrating a hardware configuration example of the MFP 101. The MFP 101 includes a central processing unit (CPU) 111, a read-only memory (ROM) 112, a random-access memory (RAM) 113, a storage 114, an operation unit interface (I/F) 115, an operation unit 116, a scanning unit I/F 117, a scanning unit 118, a print unit I/F 119, a print unit 120, a wireless communication unit I/F 121, and a wireless communication unit 122. The MFP 101 further includes a fax unit I/F 123, a fax communication unit 124, a communication unit I/F 125, and a communication unit 126.

A control unit 110 including the CPU 111 controls operations of the whole of the MFP 101. The CPU 111 reads a control program stored in the ROM 112 or the storage 114, and performs various kinds of control, such as reading control and print control. The ROM 112 stores the control program that can be executed by the CPU 111. The ROM 112 also stores a boot program, font data, and the like. The RAM 113 is a main memory, and used as a temporary storage area to develop various kinds of control programs stored in a work area, the ROM 112 and the storage 114. The storage 114 stores image data, print data, various kinds of programs, and various kinds of setting information. The storage 114 is a flash memory in the present exemplary embodiment, but may be an auxiliary storage device such as a solid state disk (SSD) and a hard disc drive (HDD). The storage 114 may also be an embedded Multi Media Card (eMMC).

While, in the MFP 101 according to the present exemplary embodiment, one CPU 111 executes each processing in a flowchart described below using one memory (RAM 113), a configuration is not limited thereto. For example, the MFP 101 can also execute each processing in the flowchart described below by causing a plurality of CPUs, a plurality of RAMs, a plurality of ROMs, and a plurality of storages to cooperate with one another. The MFP 101 may also be configured to execute part of processing using a hardware circuit, such as an application-specific integrated circuit (ASIC) and a field-programmable gate array (FPGA).

The operation unit I/F 115 connects the control unit 110 and the operation unit 116 including a display unit such as a touch panel and hardware keys. The operation unit 116 displays information to a user, and detects an input from the user.

The scanning unit I/F 117 connects the scanning unit 118, such as a scanner, and the control unit 110. The scanning unit 118 scans an image of an original document and the CPU 111 converts the scanned image to image data, such as binary data. The image data generated based on the image read by the scanning unit 118 is, for example, transmitted to an external apparatus and printed on recording paper.

The print unit I/F 119 connects the print unit 120, such as a printer, and the control unit 110. The CPU 111 forwards image data (print data) stored in the RAM 113 to the print unit 120 via the print unit I/F 119. The print unit 120 prints an image based on the forwarded image data on recording paper fed by a feed tray.

The wireless communication unit I/F 121 is an interface to control the wireless communication unit 122, and wirelessly connects the control unit 110 and an external wireless apparatus (here, mobile terminal 200).

The control unit 110 is connected to a public network 107 by the fax unit I/F 123 controlling the fax communication unit 124, such as a facsimile. The fax unit I/F 123 is an interface for controlling the fax communication unit 124, and can be connected to the public network, perform control of a facsimile communication protocol, and the like by controlling a modem for facsimile communication or a network control unit (NCU).

The communication unit I/F 125 connects the control unit 110 and the network 100. The communication unit I/F 125 is an interface for controlling the communication unit 126 to transmit image data and various kinds of information of the inside of the MFP 101 to an external apparatus on the network 100, and receive print data from an information processing apparatus on the network 100 and information on the network 100. As a transmission/reception method via the network 100, the communication unit 126 can perform transmission/reception using e-mail and file transmission using other protocols (e.g., file transfer protocol (FTP), server message block (SMB), and world wide web distributed authoring and versioning (WebDAV)). Furthermore, the communication unit 126 can transmit/receive image data and various kinds of setting data by access from the mobile terminal 200, the message application server 300, or the bot server 400 using hypertext transfer protocol (HTTP) communication.

Figure 3:
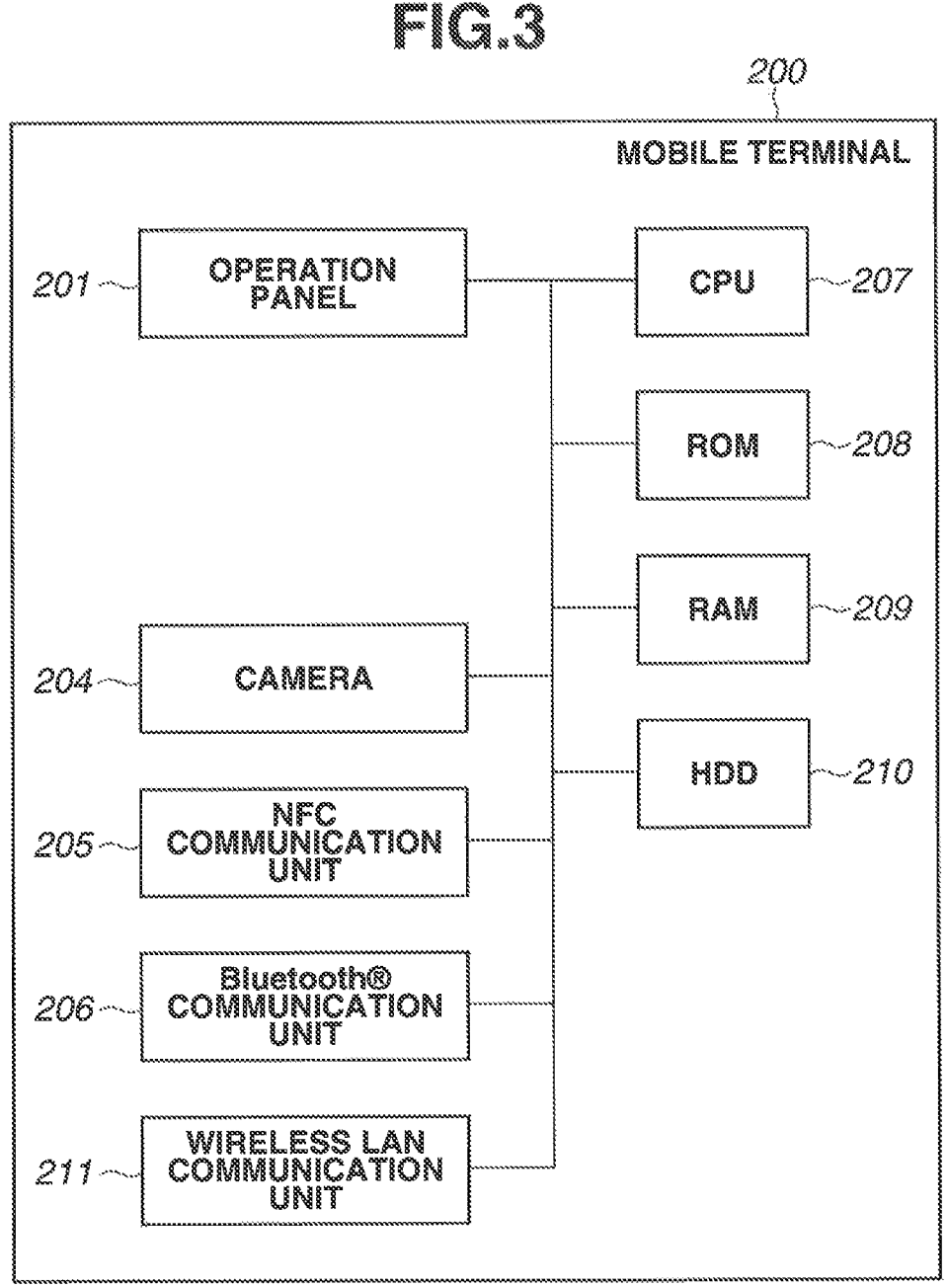
FIG. 3 is a diagram illustrating a hardware configuration example of a mobile terminal 200.

FIG. 3 is a diagram illustrating a hardware configuration example of the mobile terminal 200. While the mobile terminal 200 according to the present exemplary embodiment is an apparatus, such as a smartphone and a tablet PC, the mobile terminal 200 may be a different information processing apparatus as long as the device is capable of Wireless Fidelity (Wi-Fi) communication.

A CPU 207 reads a control program stored in a ROM 208 and executes various kinds of processing to control operations of the mobile terminal 200. The ROM 208 stores the control program. A RAM 209 is used as a temporary storage area such as a main memory and work area of the CPU 207. An HDD 210 stores various kinds of data such as a photograph and an electronic document.

An operation panel 201 has a touch panel function capable of detecting a touch operation by the user, and displays various kinds of screens provided by an operating system (OS) and an e-mail transmission application. The operation panel 201 is used to check information stored in the message application server 300. The user can input a desired operation instruction to the mobile terminal 200 by inputting a touch operation to the operation panel 201. The mobile terminal 200 includes hardware keys (not illustrated) and the user can input an operation instruction to the mobile terminal 200 using the hardware keys.

A camera 204 captures an image in response to a user instruction for capturing an image. A photograph captured by the camera 204 is stored in a predetermined area in the HDD 210. The mobile terminal 200 can acquire information from a Quick Response (QR) code (registered trademark) read by the camera 204 using a program capable of analyzing the QR code.

The mobile terminal 200 can transmit and receive data to and from various kinds of peripheral devices via a near field communication (NFC) communication unit 205, a Bluetooth® communication unit 206, or a wireless LAN communication unit 211. The Bluetooth communication unit 206 of the mobile terminal 200 may support Bluetooth® Low Energy.

Figure 4:
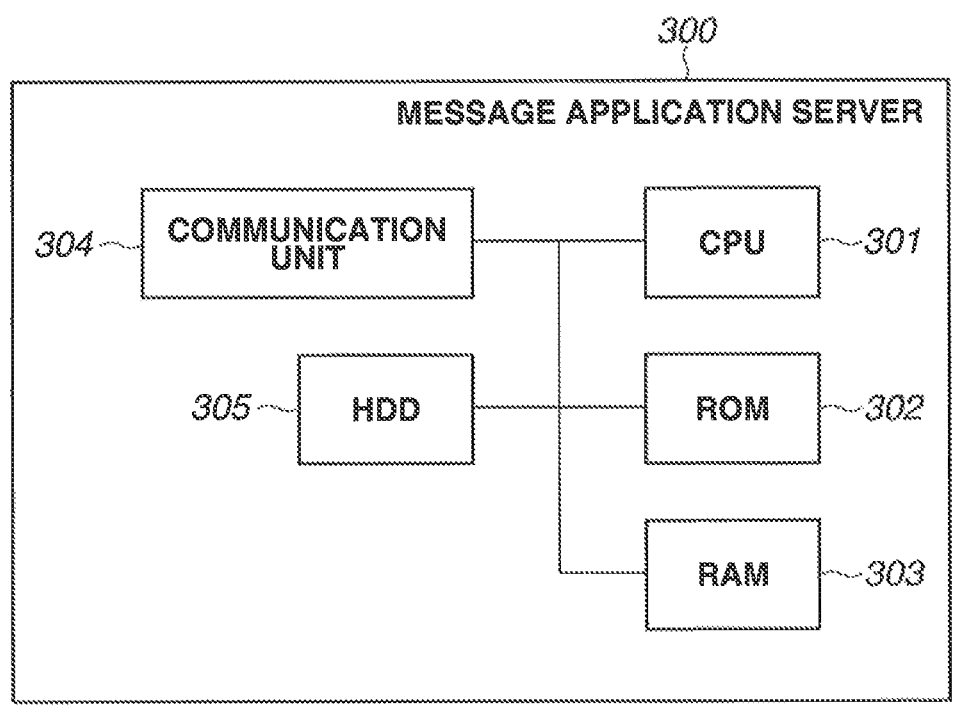
FIG. 4 is a diagram illustrating a hardware configuration example of a message application server 300.

FIG. 4 is a diagram illustrating a hardware configuration example of the message application server 300. A CPU 301 reads a control program stored in a ROM 302 and executes various kinds of processing to control operations of the message application server 300. The ROM 302 stores the control program. A RAM 303 is used as a temporary storage area for a main memory and work area of the CPU 301. An HDD 305 stores various kinds of data such as a message, image data, and channel information. The message application server 300 can transmit and receive data to and from various kinds of devices, such as the mobile terminal 200 and the MFP 101, via a communication unit 304. The communication unit 304 may perform wired communication using Ethernet (registered trademark), or perform wireless communication, such as Wi-Fi communication.

Figure 5:
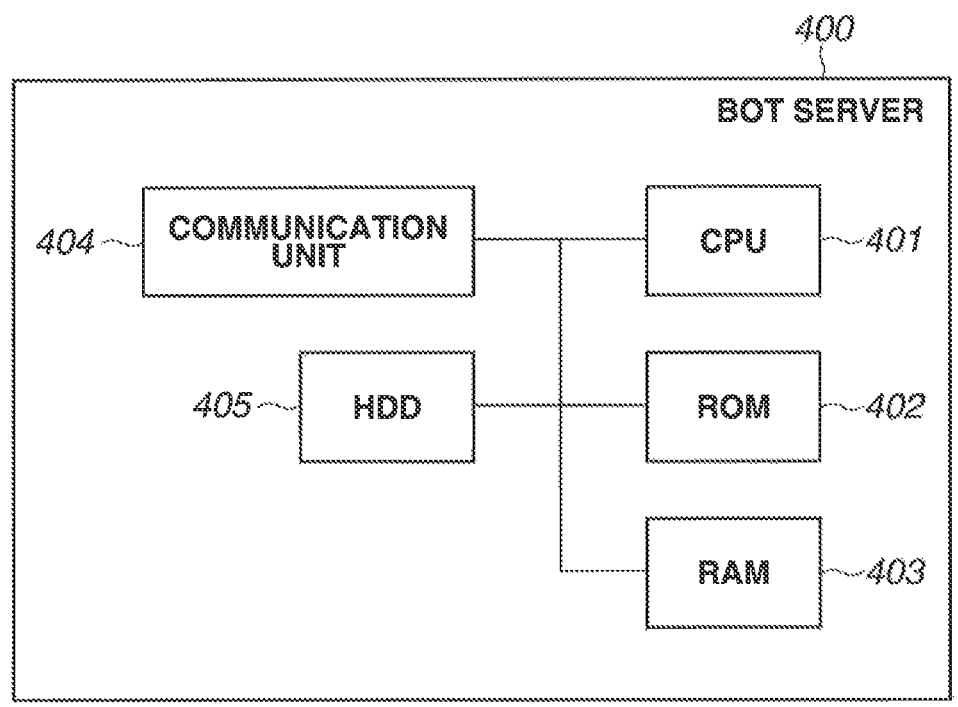
FIG. 5 is a diagram illustrating a hardware configuration example of a bot server 400.

FIG. 5 is a diagram illustrating a hardware configuration example of the bot server 400. A CPU 401 reads a control program stored in a ROM 402 and executes various kinds of processing to control operations of the bot server 400. The ROM 402 stores the control program. A RAM 403 is used as a temporary storage area for a main memory and work area of the CPU 401. An HDD 405 stores various kinds of data, such as a message, image data, and channel information. The bot server 400 can transmit and receive data to and from various kinds of devices, such as the mobile terminal 200, the MFP 101, and the message application server 300 via a communication unit 404.

Figure 14:
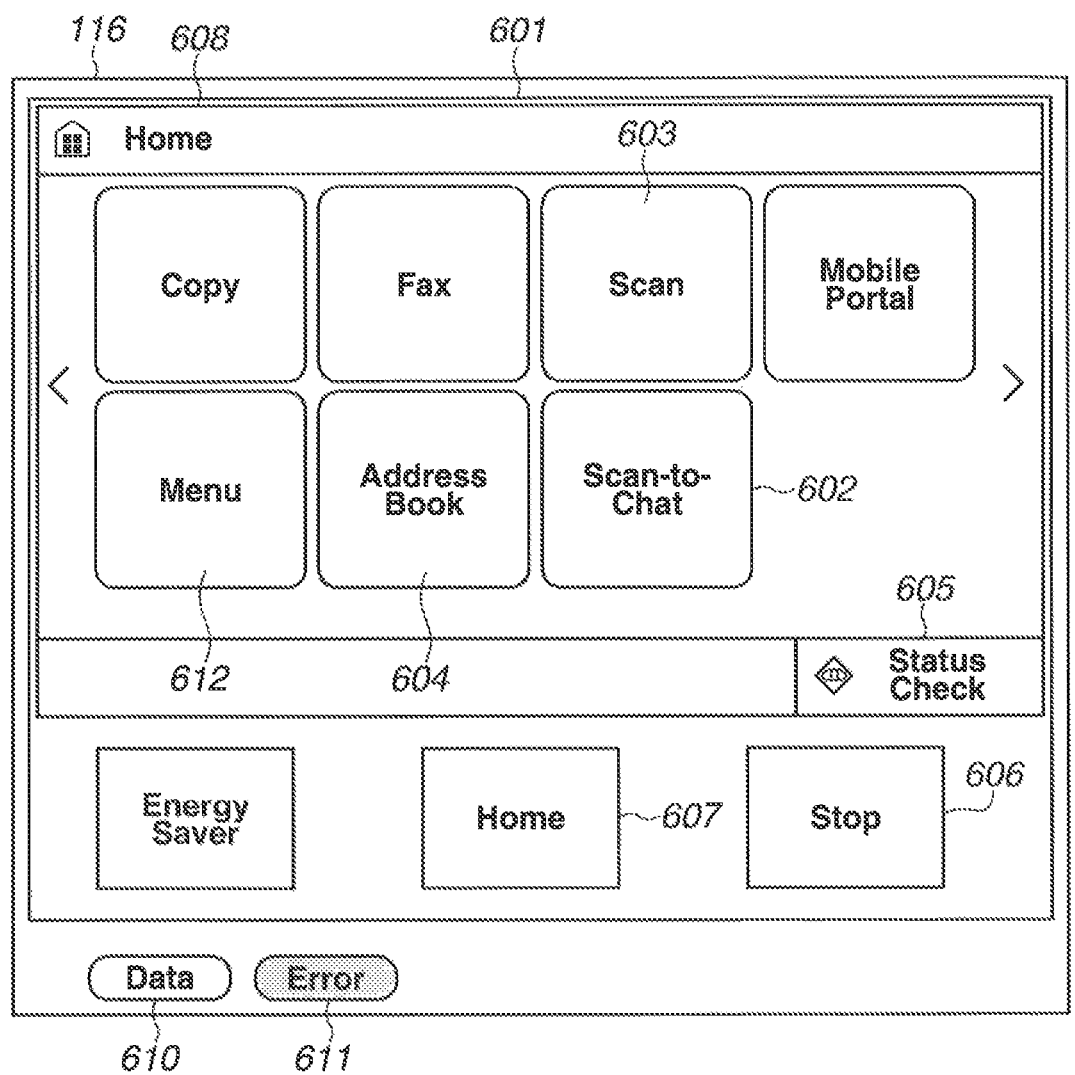
FIG. 14 is a diagram illustrating an example of a home screen which is displayed on an operation unit 116 of the MFP 101.

FIG. 14 is a diagram illustrating an example of the home screen that is displayed on the operation unit 116 of the MFP 101. The operation unit 116 includes a touch panel 601 displaying an operation screen and light emitting diodes (LEDs) 610 and 611. The touch panel 601 serves as an instruction means, and also serves as an acceptance means to accept an instruction from the user and a display means to display a screen. The user directly touches the screen displayed on the touch panel 601 with an object, such as a finger and a stylus, to instruct execution of each function based on the displayed screen.

The touch panel 601 illustrated in FIG. 14 displays a home screen 608. The home screen 608 is an initial screen that is used by the user to instruct execution of each function of the MFP 101 and select a screen display for making various kinds of settings for functions executed by the MFP 101, such as copying, fax, scanning, and media print.

A status check button 605 is an object to display a screen (status check screen) for checking a status of the MFP 101. A transmission history and a job execution history can be displayed on the status check screen (not illustrated).

Figure 15A:
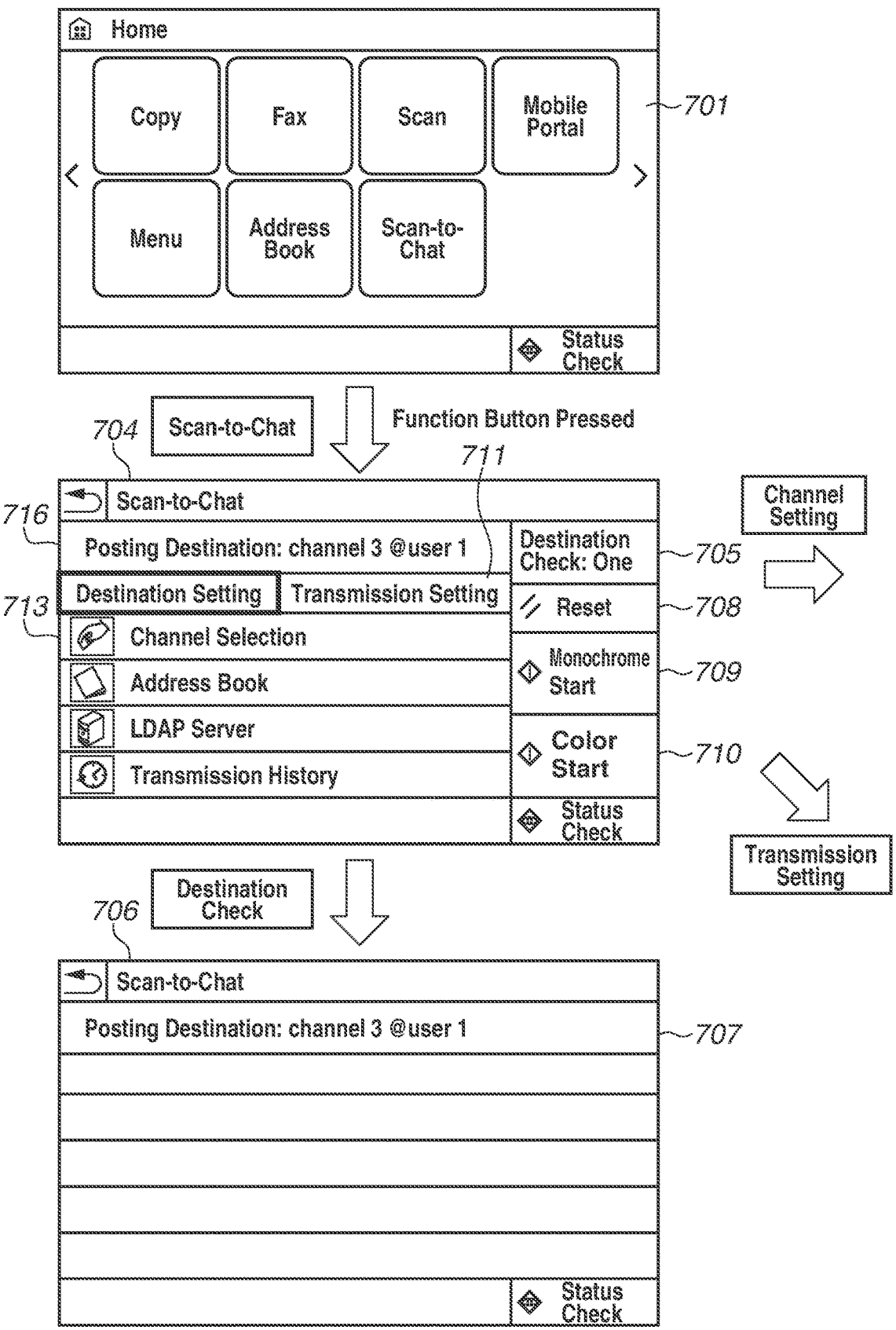

A scan-to-chat button 602 is an object to display a setting screen for scan-to-chat processing. In a case where the scan-to-chat button 602 is selected by the user, a setting screen 704 illustrated in FIG. 15A is displayed on the operation unit 116. The scan-to-chat processing will be described in detail with reference to FIGS. 6 and 7.

A scan button 603 is an object to display a scan selection screen (not illustrated) from the MFP 101. The scan selection screen is a screen for selecting a transmission function, such as e-mail transmission (e-mail), file transmission via the SMB, the FTP, and the HTTP, and Internet fax (I-fax) communication. Touching an object indicating a displayed transmission function displays a setting screen for the corresponding transmission function.

An address book button 604 is an object to display an address book screen of the MFP 101 in a case where the user selects the object. The LEDs 610 and 611 notify the user of the status of the MFP 101. The LED 610 turns on during reception of an email or reception or execution of a print job, and the LED 611 turns on in a case where an error occurs in the MFP 101. A stop button 606 is an object to execute cancellation of various kinds of operations, and is always displayed on the operation unit 116. A home button 607 is an object to display the home screen 608, and is always displayed on the operation unit 116. A menu button 612 is an object to display a screen to make an environment setting, such as a language, and a setting of each function.

Figure 6:
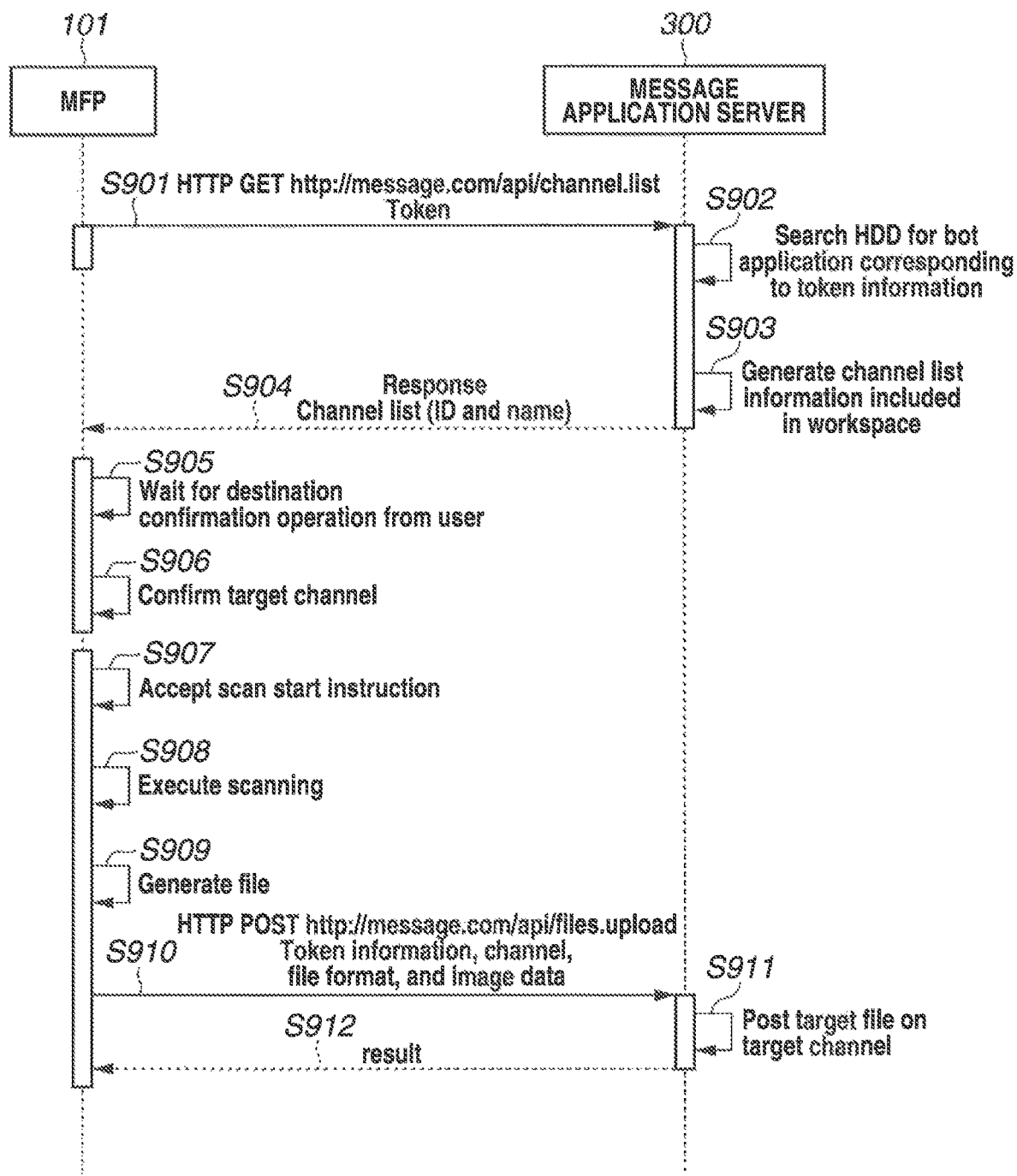
FIG. 6 is a diagram illustrating an example of a sequence of transmitting a file generated by scanning by the MFP 101 to the message application server.

FIG. 6 is a diagram illustrating an example of a sequence of transmitting a file generated by scanning in the MFP 101 to the message application server 300. The sequence illustrated in FIG. 6 is started in a case where a channel selection button 713 on the setting screen 704 illustrated in FIG. 15A is selected.

In step S901, the CPU 111 of the MFP 101 controls the communication unit 126 to make a request for channel list information to the message application server 300 using HTTP communication. Specifically, the communication unit 126 transmits token information input to the MFP 101 and information indicating a request for a channel list included in a workspace indicated in the token information to the message application server 300. A command to be transmitted in this operation is, for example, "HTTP GET https://message.com/api/channels.list". A uniform resource locator (URL) "https://message.com/api/channels.list" described in this command is a URL by which the MFP 101 accesses the message application server 300. The token information is transmitted to the URL, and therefore the message application server 300 searches for a workspace and a bot application corresponding to the token information. The token information is input by the user via a setting registration screen 1501 that is displayed on the operation unit 116 of the MFP 101 and illustrated in FIG. 13.

The workspace refers to an organization to which a plurality of users belongs in a message application. The channel is like a chat room in the workspace. The chat room is a mechanism for a plurality of users participating the chat room to transmit/receive a message among themselves and communicate with each other like a conversation. While, in the present exemplary embodiment, a chat room is taken as an example of the channel, the channel is not limited to a chat room as long as a channel has a mechanism for a plurality of users to transmit/receive a message among themselves and communicate with each other like a conversation. For example, the channel may be a group chat, a room, a talk room, or a group.

The bot application is an application to register the MFP 101 as a user in the message application and post a message and/or image data, and is installed in the message application server 300. The bot application is designated and image data is transmitted to the message application server 300, and therefore the bot application posts the transmitted image data on the message application. The HDD 305 of the message application server 300 stores the bot application and a token in correspondence with each other, and the bot application and the workspace in correspondence with each other. Thus, by receiving token information from the MFP 101, the message application server 300 can return information of the workspace in correspondence with the bot application that is in correspondence with the token information. The token information, the bot application, and the workspace may be in a direct correspondence with one another. With this configuration, it is possible to select the workspace corresponding to the token information registered in advance (workspace to which user wants to transmit image data) from among a multitude of workspaces.

In step S902, the CPU 301 of the message application server 300 refers to the token information received via the communication unit 304, and searches the HDD 305 for the bot application corresponding to the token information.

In step S903, the CPU 301 of the message application server 300 checks whether access to the URL has been permitted based on the token information received via the communication unit 304 from the MFP 101. In a case where the access has been permitted, the CPU 301 generates channel list information included in the workspace corresponding to the token information. The channel list information is array information indicating channel information.

The channel information includes channel identification (ID), a channel name, information indicating users participating in the channel, a channel setting value indicating a setting of whether the channel is an archive channel.

In step S904, the CPU 301 of the message application server 300 controls the communication unit 304 to transmit the channel list information as response information of the HTTP communication to the MFP 101.

In step S905, the CPU 111 of the MFP 101 generates a channel selection screen 714 based on the channel information included in the received channel list information. The user selects the channel selection button 713, and therefore the CPU 111 of the MFP 101 controls the touch panel 601 of the operation unit 116 to display the channel selection screen 714, and waits for a user operation. The channel selection screen 714 will be described below with reference to FIG. 15B.

In step S906, the user selects at least a channel on the channel selection screen 714 and then selects a back button 715, and therefore the CPU 111 of the MFP 101 confirms the channel information of a posting destination.

In step S907, the CPU 111 of the MFP 101 accepts a scan execution instruction via the operation unit 116.

In step S908, the CPU 111 of the MFP 101 performs scanning in accordance with a scan setting being set at the time of accepting the scan execution instruction.

In step S909, the CPU 111 of the MFP 101 generates image data of a scanned image in a format set with the scan setting. A scan setting designated by the user on a detailed setting screen for scan-to-chat (not illustrated) is used as the scan setting. The scan setting may be displayed together with a transmission setting on a transmission setting screen 712 illustrated in FIG. 15B and set.

In step S910, the CPU 111 of the MFP 101 transmits the same token information as that input in step S901, the channel information of the posting destination selected in step S906, a file format, and the image data generated in step S909 to the message application server 300 using the HTTP communication. A file format designated by the user on the transmission setting screen 712 for scan-to-chat is used as the file format.

In step S911, the CPU 301 of the message application server 300 searches for registered workspace information and application information using the token information received in step S910, and stores the received image data and the channel designated by the channel information in correspondence with each other. In a case where the user in the posting destination is designated, the CPU 301 stores the received image data, the channel, and also the user in the posting destination in correspondence with one another. With this configuration, the user designates the channel to check contents of a previous conversation on the channel after activating the message application on the mobile terminal 200, and therefore a screen on which the received image data has been posted is displayed.

In step S912, the CPU 301 of the message application server 300 transmits a result corresponding to whether posting has succeeded as response information of the HTTP communication to the MFP 101. In a case where the posting has succeeded, the CPU 111 of the MFP 101 may display a notification that the posting has succeeded on the operation unit 116. In a case where the posting has failed, the CPU 111 of the MFP 101 may display a notification that the posting has failed on the operation unit 116. Alternatively, the CPU 111 of the MFP 101 may display the notification that the posting has failed only in a case where the posting has failed, and may not display any notification in a case where the posting has succeeded.

Figure 7:
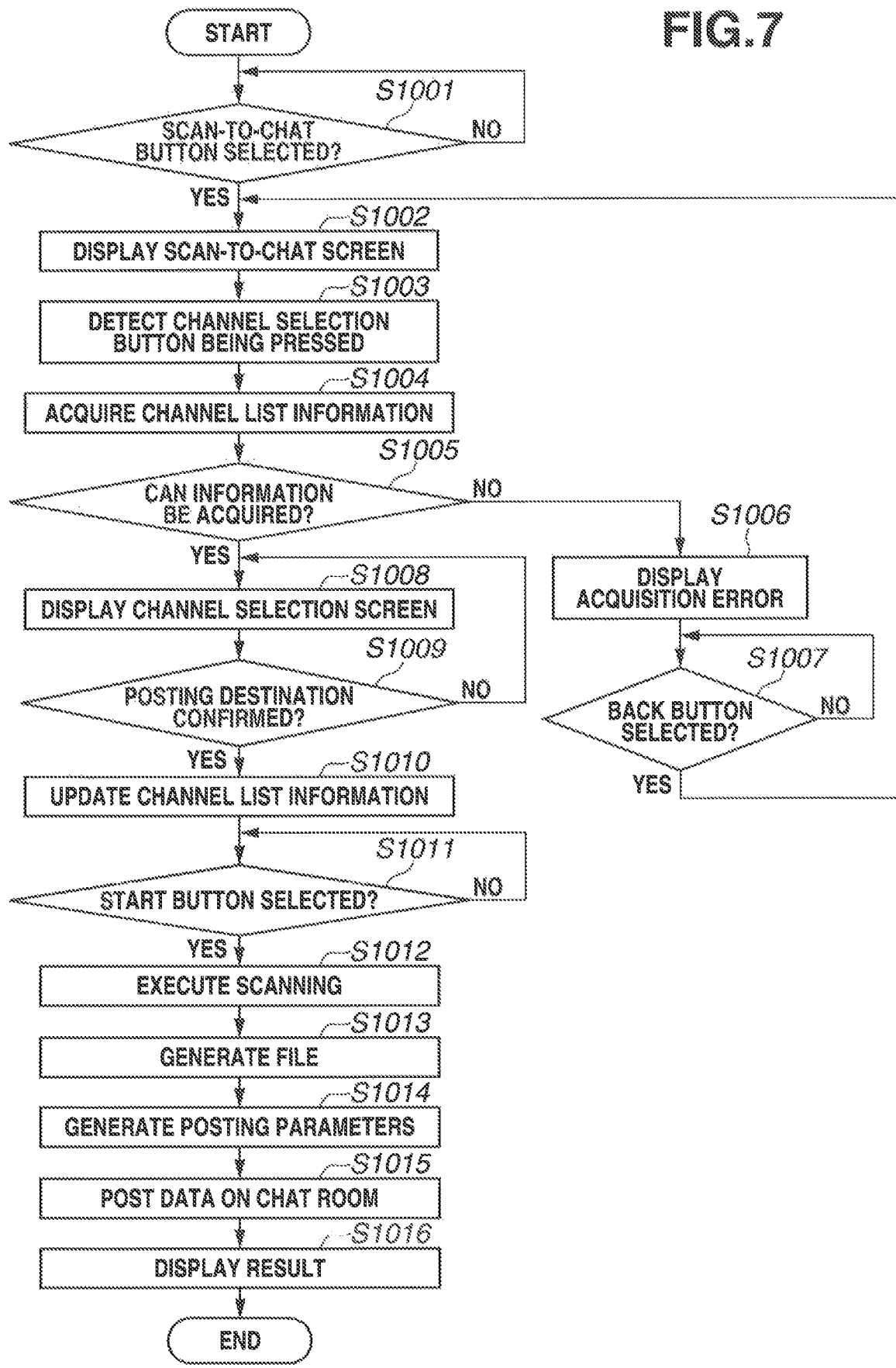
FIG. 7 is a flowchart illustrating an example of scan-to-chat processing executed by the MFP 101.

FIG. 7 is a flowchart illustrating an example of the scan-to-chat processing executed by the MFP 101. The processing in the flowchart illustrated in FIG. 7 is executed by the CPU 111 loading a program stored in the ROM 112 to the RAM 113 and executing the program. Turning on of the MFP 101 starts the processing procedure illustrated in FIG. 7.

In step S1001, the CPU 111 determines whether the scan-to-chat button 602 has been selected. In a case where the CPU 111 determines that the scan-to-chat button 602 has been selected (YES in step S1001), the processing proceeds to step S1002. In a case where the CPU 111 determines that the scan-to-chat button 602 has not been selected (NO in step S1001), the processing returns to step S1001.

In step S1002, the CPU 111 displays the setting screen 704 on the touch panel 601 of the operation unit 116. Screen transition in a case where the scan-to-chat button 602 has been selected will be described with reference to FIGS. 15A and 15B.

FIGS. 15A and 15B are diagrams illustrating an example of screen transition in the scan-to-chat processing. The scan-to-chat button 602 displayed on the home screen 608 is selected, and therefore the touch panel 601 of the operation unit 116 displays the setting screen 704.

A destination check button 705 is displayed on the setting screen 704. The number of destinations set as posting destinations of the image data generated by scanning is displayed on the destination check button 705. A description will be given of the example illustrated in FIG. 15A in which one channel serving as the posting destination has been selected. In a case where a plurality of destinations has been selected, the number of set posting destinations is displayed as the number of destinations.

In a case where the destination check button 705 is selected, a scan-to-chat destination check screen 706 is displayed. The channel selection button 713 is selected, and therefore a set transmission and posting destination is displayed on the scan-to-chat destination check screen 706. The number of posting destinations set at this time point is displayed on a posting destination button 707. In a case where the user selects the posting destination button 707, the scan-to-chat destination check screen 706 displaying the set posting destination (destination) is displayed. The posting destination button 707 is then set, and therefore a detailed screen (not illustrated) is displayed for details of the set posting destination.

While only one posting destination is displayed on the scan-to-chat destination check screen 706 in the present exemplary embodiment, the number of posting destinations is not limited thereto. For example, the MFP 101 sets a plurality of posting destinations from the message application server 300, and therefore a plurality of posting destination buttons can be displayed on the scan-to-chat check screen 706.

In a case where a reset 708 is selected on the setting screen 704, the set information is cleared. In this operation, the set destination information is cleared. In a case where a monochrome start button 709 or a color start button 710 is selected on the setting screen 704, scanning and transmission processing starts.

In a case where a transmission setting button 711 is selected, the transmission setting screen 712 is displayed. On transmission setting screen 712, a transmission setting such as a file format 717 can be changed and checked.

In a case where the channel selection button 713 is selected, the channel selection screen 714 is displayed. Channels and users displayed on the channel selection screen 714 are displayed based on the channel list information received by the MFP 101 from the message application server 300. On the channel selection screen 714, the user can select which channel posting is to be made and to which user notification will be made from among users belonging to the channel. That is, the user can select a channel on which the posting is made and a user to be notified. Users belonging to the channel are displayed on a pull-down menu by the channel button being selected. On the channel selection screen 714, both the channel and the user may be selected, or only the channel may be selected to make the posting to all the users belonging to the channel. Alternatively, a plurality of channels may be selected, or one channel may be selected and then a plurality of users belonging to the channel can be selected. Alternatively, a plurality of channels may be selected and then different users belonging to different channels can be selected.

In a case where the back button 715 is selected, contents of the selected channel are retained, and the setting screen 704 is displayed again. In the posting destination field 716, the name of the selected channel as the posting destination and the name of the user to be notified are displayed as "Posting Destination: channel 3 @user 1". The CPU 111 of the MFP 101 stores the posting destination set in this operation based on the channel and user to the RAM 113 or the storage 114.

The description will be back to the flowchart illustrated in FIG. 7. In step S1002, the CPU 111 displays the setting screen 704 illustrated in FIG. 15A on the operation unit 116. In step S1003, the CPU 111 detects that the channel selection button 713 is selected.

In step S1004, in response to the channel selection button being selected, the CPU 111 executes processing of transmitting information indicating the request for the channel list information to the message application server 300 using the HTTP communication by using the token information 1503 registered in advance.

Figure 13:
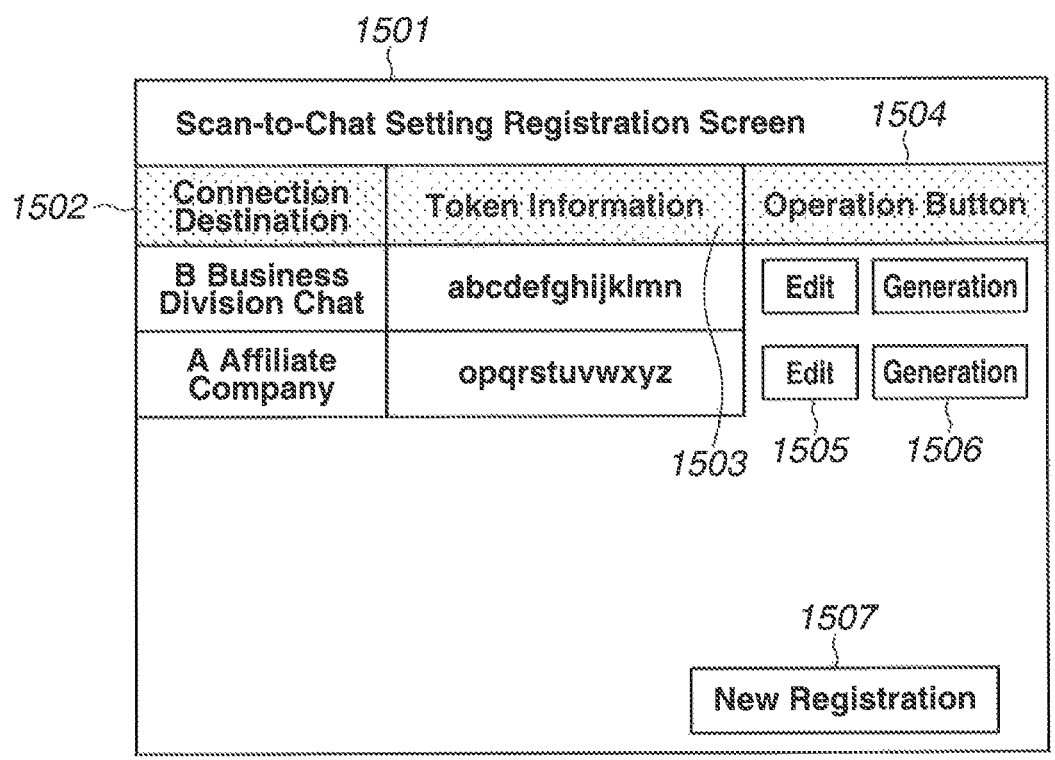
FIG. 13 is a diagram illustrating an example of a setting registration screen.

A description will be given of a setting registration screen illustrated in FIG. 13. FIG. 13 is a diagram illustrating an example of the setting registration screen. The setting registration screen 1501 is a screen displayed on the operation unit 116 of the MFP 101. The setting registration screen 1501 may be displayed as a web page on an operation unit of an information processing apparatus such as a PC connected to the MFP 101 via the network. Contents registered on the setting registration screen 1501 are stored in the storage 114 according to the first exemplary embodiment, and stored in the HDD 405 according to a second exemplary embodiment.

A connection destination 1502 is a column of pieces of organization information of connection destinations. The token information 1503 is a column of pieces of registered token information. An operation button 1504 is a column of operation buttons. An edit button 1505 and a generation button 1506 are displayed in the column of operation buttons.

In a case where the edit button 1505 is selected, a character string, such as the token information and connection destination information, can be input and changed by a keyboard and the like. In a case where the generation button 1506 is selected, the scan-to-chat button 602 is set to be displayed on the home screen 608. Contents registered on the setting registration screen 1501 are stored in the storage 114 according to the first exemplary embodiment.

A new registration button 157 is selected, and therefore the CPU 111 can accept an input of the character string by the user, and add and register the connection destination and the token information.

The description will be back to the flowchart illustrated in FIG. 7. In step S1005, the CPU 111 determines whether the MFP101 has received the channel list information from the message application server 300 in response to the request for acquiring the channel list information transmitted in step S1004. Specifically, the CPU 111 determines that the MFP101 has not received the channel list information in a case where a status code in a response of the HTTP communication is an error, or in a case where a parameter indicating that the information cannot be acquired is included in body information of the response. In a case where the CPU 111 determines that the MFP101 has received the channel list information (YES in step S1005), the processing proceeds to step S1008. In a case where the CPU 111 determines that the MFP101 has not received the channel list information (NO in step S1005), the processing proceeds to step S1006.

In step S1006, the CPU 111 displays that the MFP101 has been failed to receive the channel list information, on the channel selection screen 714. In this operation, channel and user options are not displayed on the channel selection screen 714.

In step S1007, the CPU 111 determines whether the back button 715 has been selected. In a case where the CPU 111 determines that the back button 715 has been selected (YES in step S1007), the processing returns to step S1002. In a case where the CPU 111 determines that the back button 715 has not been selected (NO in step S1007), the processing returns to step S1007.

In step S1008, the CPU 111 displays the channel selection screen 714 displaying the channel information and the like received from the message application server 300 on the touch panel 601 of the operation unit 116.

In step S1009, the CPU 111 detects whether the posting destination (channel or channel and user) selected on the channel selection screen via the touch panel 601 of the operation unit 116 has been confirmed. In a case where the posting destination has been confirmed (YES in step S1009), the processing proceeds to step S1010. In step S1010, the CPU 111 updates channel list information. In a case where the posting destination has not been confirmed (NO in step S1009), the processing returns to step S1008. A method of detecting the confirmation is performed by detecting whether the back button 715 has been selected. In a case of a screen having a confirmation button displayed on the screen of the operation unit 116, the CPU 111 also performs the similar transition control in a case where the confirmation button has been selected.

In step S1010, the CPU 111 displays the setting screen 704 illustrated in FIG. 15A on the operation unit 116, and updates a display of the posting destination field 716 using the posting destination confirmed in step S1009. In these operations, the CPU 111 displays information about the user desired to be notified, together with the posting destination channel, on the operation unit 116.

In step S1011, the CPU 111 determines whether the monochrome start button 709 or the color start button 710 displayed on the operation unit 116 has been selected. In a case where the CPU 111 determines that the monochrome start button 709 or the color start button 710 has been selected (YES in step S1011), the processing proceeds to step S1012. In a case where the CPU 111 determines that either of the start buttons has not been selected (NO in step S1011), the processing returns to step S1011.

In step S1012, the CPU 111 controls the scanning unit 118 based on a scan setting to scan an image of an original document and generate image data. As the scan setting, a scan setting designated by the user on the detailed setting screen for scan-to-chat (not illustrated) is used.

In step S1013, the CPU 111 converts the image data generated in step S1012 to a file format 717 set on the transmission setting screen 712.

In step S1014, the CPU 111 generates posting parameters. The posting parameters include parameters of the posting destination channel, a file format, a file name, and a posting comment. A file format corresponding to the file format 717 set by the transmission setting is set as the file format. As the posting comment, characters are generated by adding "@" to the head of user information of the user desired to be notified. A file name designated by the transmission setting is designated as the file name.

In step S1015, the CPU 111 transmits the file generated in step S1013 and the posting parameters to the message application server 300 using a power on self test (POST) method of the HTTP communication by using the token information 1503 registered in advance. These pieces of data (file to which image data has been converted and posting parameters) are transmitted to the message application server 300, and therefore the message application server 300 controls posting of the pieces of data for a user who receives the received file.

In step S1016, the CPU 111 receives a posting result from the message application server 300 and displays the posting result on the touch panel 601 of the operation unit 116. According to the present exemplary embodiment, the user can easily post a file on the channel of the message application server 300 from the MFP 101.

While, only one piece of token information is registered in the present exemplary embodiment, in a case where a plurality of pieces of token information is registered, the processing regarding the token information, i.e., the processing in steps S1004, S1005, and S1015, and the like is to be repeatedly executed for the number of registered tokens.

Figure 12:
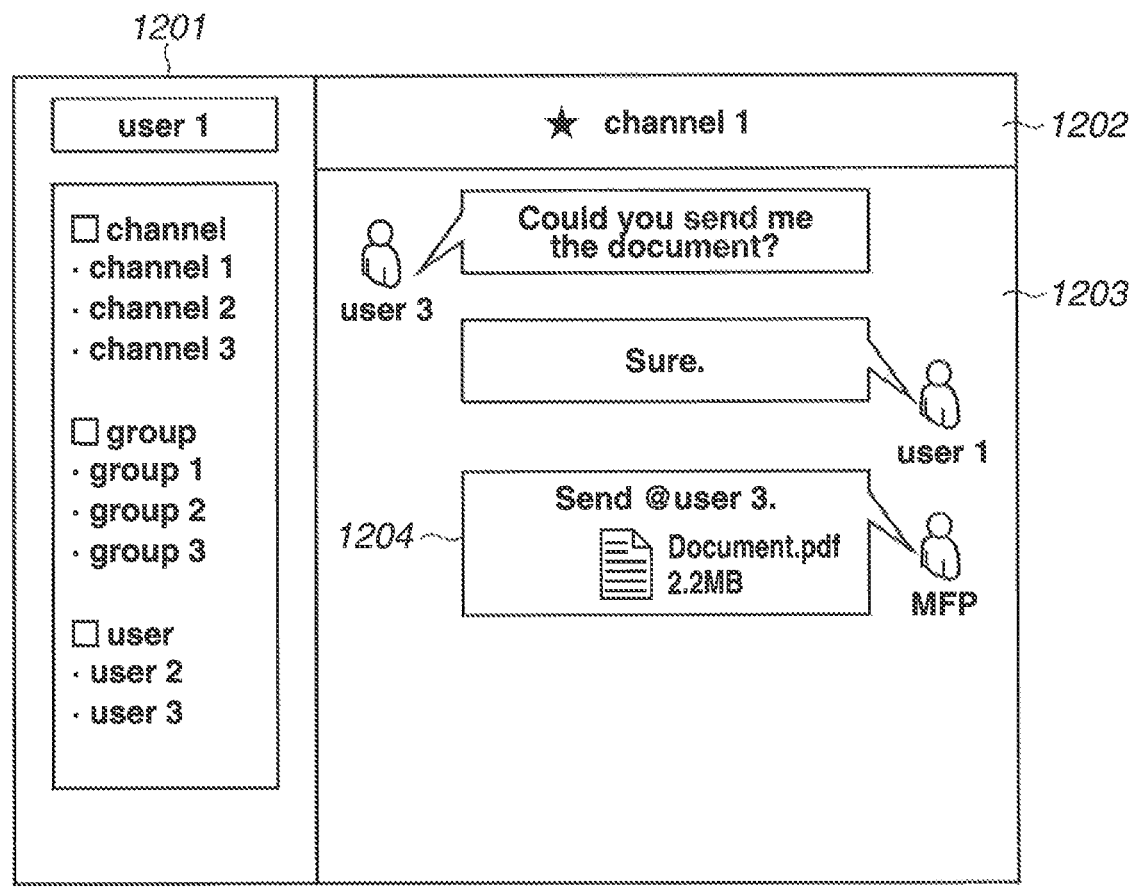
FIG. 12 is a diagram illustrating an example of a message screen of a message application.

With reference to FIG. 12, a description will be given of an example of a screen to be displayed on the operation panel 201 of the mobile terminal 200 when the file to which the image data has been converted and the posting parameters are transmitted to the message application server 300 in the processing in step S1015.

FIG. 12 is a diagram illustrating an example of a message screen of a message application. A message screen 1201 illustrated in FIG. 12 is displayed after the message application is activated on the mobile terminal 200 and the processing in step S1015 is executed in the MFP 101. The mobile terminal 200 communicates with the message application server 300.

A screen dedicated to the user is displayed after the user activates the message application on the mobile terminal 200 and enters the user's account ID and password to log in to the message application.

A message 1204 is a message that is displayed (posted) by a user having an account of a user 1 transmitting the image data generated by scanning and the posting parameters to the message application server 300 using the MFP 101. In the example illustrated in FIG. 12, a "channel 1" is designated as the posting destination channel among the posting parameters, and a "user 3" belonging to the channel 1 is designated as the user. This example also indicates that "Document.pdf" is designated as the file name of the posting parameters, and a comment "Send" is designated. The file name and the comment are designated by the user on the detailed setting screen for scan-to-chat (not illustrated).

Channels in which the user who has logged in to the message application participates, groups, and users are displayed on the message screen 1201 of the message application, other party information 1202 and exchange of messages 1203 are also displayed. In the message 1204, a comment having "@" at the top of a user name is posted, which indicates that the user who has posted the comment wants to notify especially a designated user among users belonging to the channel. In the case of the example in FIG. 12, the user 3 can notice that the posting has been received more quickly than the other members belonging to the channel in accordance with a terminal to browse the message application. In a case where the user 3 uses a smartphone as the mobile terminal 200 to browse the message application, the mobile terminal 200 notifies the user 3 by a function of icon notification, vibration, or notification sound. In a case where the user 3 uses a desktop terminal as the mobile terminal 200 to browse the message application, the mobile terminal 200 notifies the user 3 by a function of desktop notification or the like. When displaying the message screen 1201, the message application server 300 searches a data structure illustrated in FIG. 11 for necessary information and displays the information. For example, the message 1204 posted on the channel corresponds to a "statement 3+file 1" in an exchanged content 505, and the message application server 300 acquires attribute information, such as the name of the file 1, from a file 504, and displays the attribute information in a form of a file icon in the message. In a case where the file icon is selected by the user, the message application server 300 can acquire the file 1 belonging to the file 504. While the file posted on this channel is displayed as the icon, a preview image of the file may be displayed.

Figure 11:
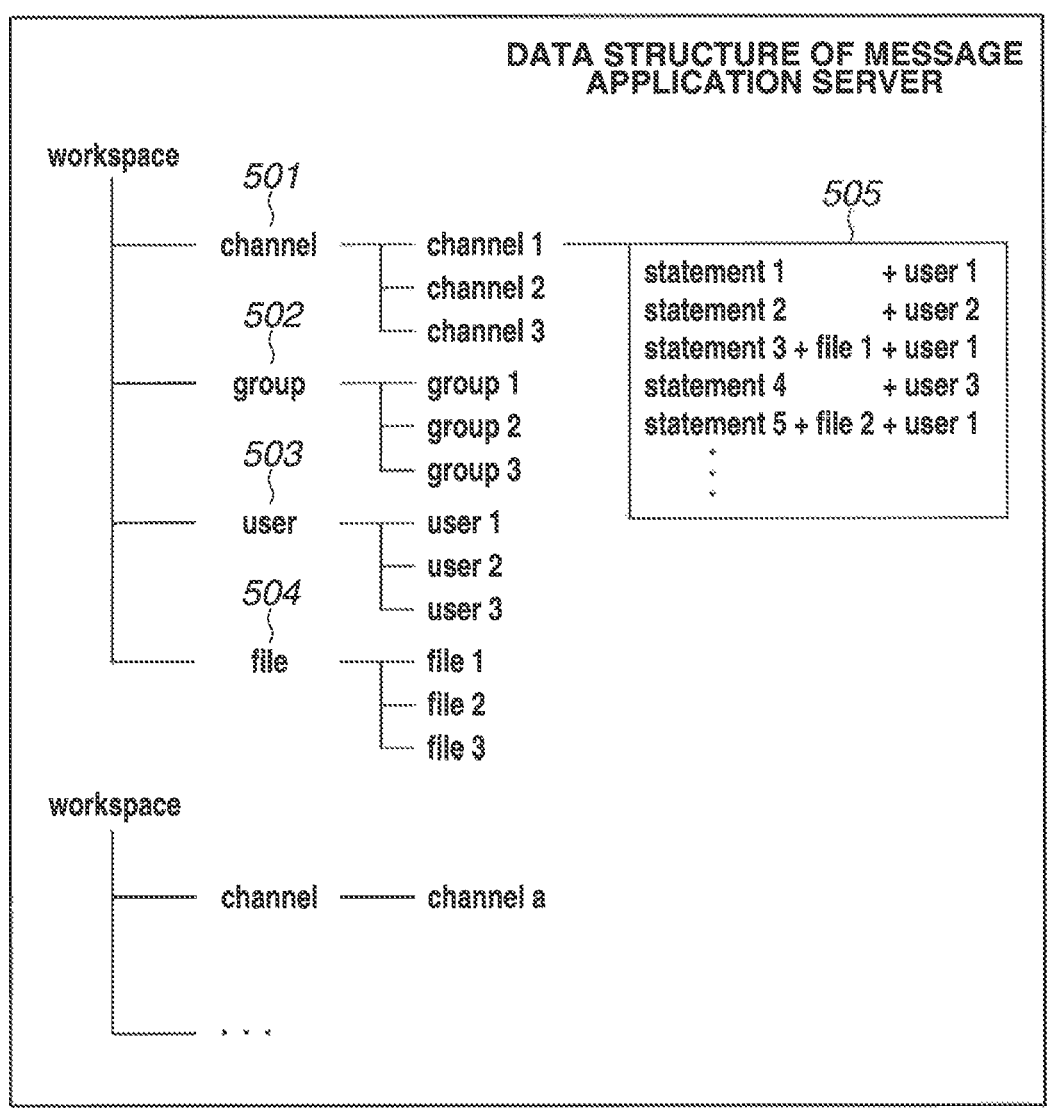
FIG. 11 is a diagram illustrating an example of a file structure in the message application server.

FIG. 11 is a diagram illustrating an example of a file structure in the message application server. This file structure is stored in the HDD 305 of the message application server 300, and the screen illustrated in FIG. 12 is displayed based on this file structure. The message application server 300 has small clusters of channels, groups, users, files, and the like in the largest cluster called a workspace and manages data. A channel 501 is a chat room of a kind in which all members of the workspace can participate, and all posted contents can be searched by any of the members. A group 502 is a channel for discussion that is not available to all the members, and requires an invitation for browsing and participation. A user 503 indicates users who participate in the workspace. An attached file is stored in the file 504. Furthermore, the exchanged content 505 in the channel 501 and the group 502 and by the user 503 are stored while being in correspondence with one another. For example, users who participate in the channel 1 are stored in the channel 1 while being in correspondence with the channel 1, and messages and image data exchanged in the channel 1 are also stored in the channel 1 while being in correspondence with the channel 1. Since data is stored in this manner, a user corresponding to the designated channel information can be displayed in a case where the channel is selected on the channel selection screen 714. Users who participate in the channel can be displayed.

Second Exemplary Embodiment

The description has been given of the first exemplary embodiment using the example in which the MFP 101 transmits image data and posting parameters directly to the message application server 300. A description will be given of a second exemplary embodiment using an example in which the MFP 101 transmits image data and posting parameters to the message application server 300 via the bot server 400.

Figure 8:
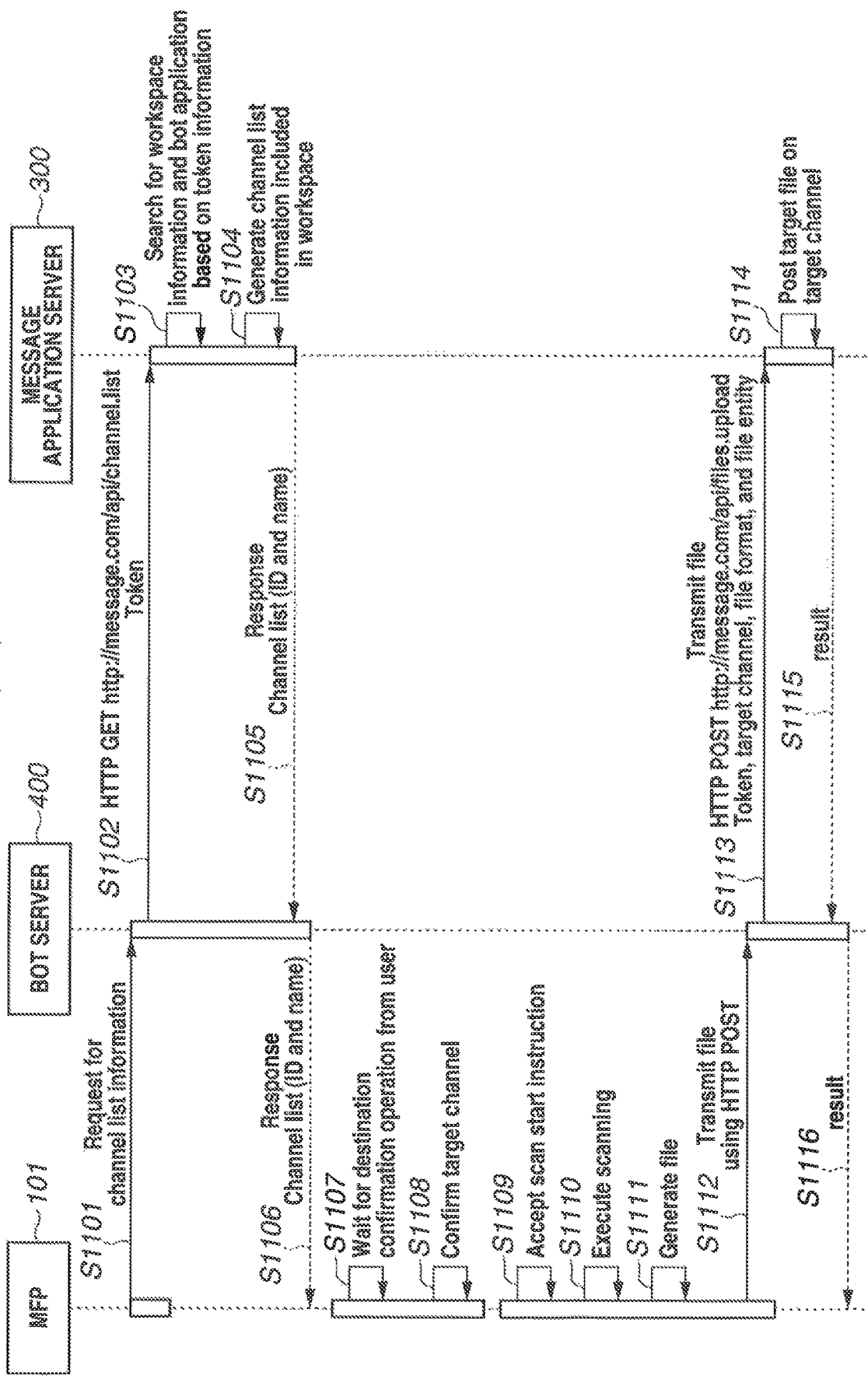
FIG. 8 is a diagram illustrating an example of a sequence of transmitting a file generated by scanning by the MFP 101 to the message application server 300 via the bot server 400.

FIG. 8 is a diagram illustrating an example of a sequence of transmitting a file generated by scanning in the MFP 101 to the message application server 300 via the bot server 400.

In step S1101, the CPU 111 of the MFP 101 makes a request for channel list information to the bot server 400 using the HTTP communication by using device ID or user ID as a parameter.

In step S1102, the CPU 401 of the bot server 400 transmits to the message application server 300 information indicating the request for the channel list information using the HTTP communication by using token information corresponding to the received device ID or user ID. Token information corresponding to the device ID or user ID received in step S1101 is acquired as the token information.

FIG. 16 is a diagram illustrating an example of correspondence between ID and token information. A table illustrated in FIG. 16 includes the user ID or the device ID and authentication information (token information) registered while being in correspondence with each other. This table is stored in the HDD 405 of the bot server 400. Each of the user ID and the device ID is information stored in the MFP 101. The user ID is user-identification information set to each user who uses the MFP 101. The device ID is device-identification information set to each MFP. The user ID is identification information set by the user at the time of generating a user account for logging in to the MFP 101. The device ID is factory default identification information unique to the MFP 101.

In step S1103, the CPU 301 of the message application server 300 searches for registered workspace information and a bot application, based on the token information.

In step S1104, the CPU 301 of the message application server 300 checks whether the used URL has been permitted, based on application information. In a case where the URL has been permitted, the CPU 301 generates channel list information of a channel belonging to a workspace. The channel list information is array information of channel information. The channel information includes channel ID, a channel name, an ID list of members belonging to the channel, and a setting value indicating whether the channel is an archive channel.

In step S1105, the CPU 301 of the message application server 300 controls the communication unit 304 to transmit the channel list information as response information to the HTTP communication to the bot server 400.

In step S1106, the CPU 401 of the bot server 400 transmits the channel list information received in step S1105 as a response to the HTTP communication to the MFP 101.

Since processing in step S1107 to S1111 is similar to the processing in steps S905 to S909 illustrated in FIG. 6, a redundant description thereof will be omitted.

In step S1112, the CPU 111 of the MFP 101 transmits the device ID or the user ID, information indicating a posting destination channel, information indicating a file format or the like, and image data to the bot server 400 using the HTTP communication.

In step S1113, the CPU 401 of the bot server 400 executes processing of transmitting the received information indicating the posting destination channel, the received information indicating the file format, the received image data, and token information corresponding to the received device ID or user ID to the message application server 300. In this operation, the CPU 401 refers to the table which is stored in the HDD 405 and in which the device ID or the user ID and the token information are registered in correspondence with each other, to determine the token information to be transmitted.

Since processing in step S1114 is similar to the processing in step S911, a redundant description thereof will be omitted.

In step S1115, the CPU 301 of the message application server 300 transmits a result corresponding to whether the posting has succeeded as response information to the HTTP communication to the bot server 400.

In step S1116, the CPU 401 of the bot server 400 transmits the result corresponding to whether the posting has succeeded as the response information to the HTTP communication to the MFP 101. In a case where the posting has succeeded, the CPU 111 of the MFP 101 may display a notification that the posting has succeeded, on the operation unit 116. In a case where the posting has failed, the CPU 111 of the MFP 101 may display a notification that the posting has failed, on the operation unit 116. Alternatively, the CPU 111 of the MFP 101 may display the notification that the posting has failed, only in a case where the posting has failed without displaying any notification in a case where the posting has succeeded.

While the channel list is acquired in the present exemplary embodiment, a limited-access group list and a user list for individual posting can be posted in a similar manner.

Figure 9:
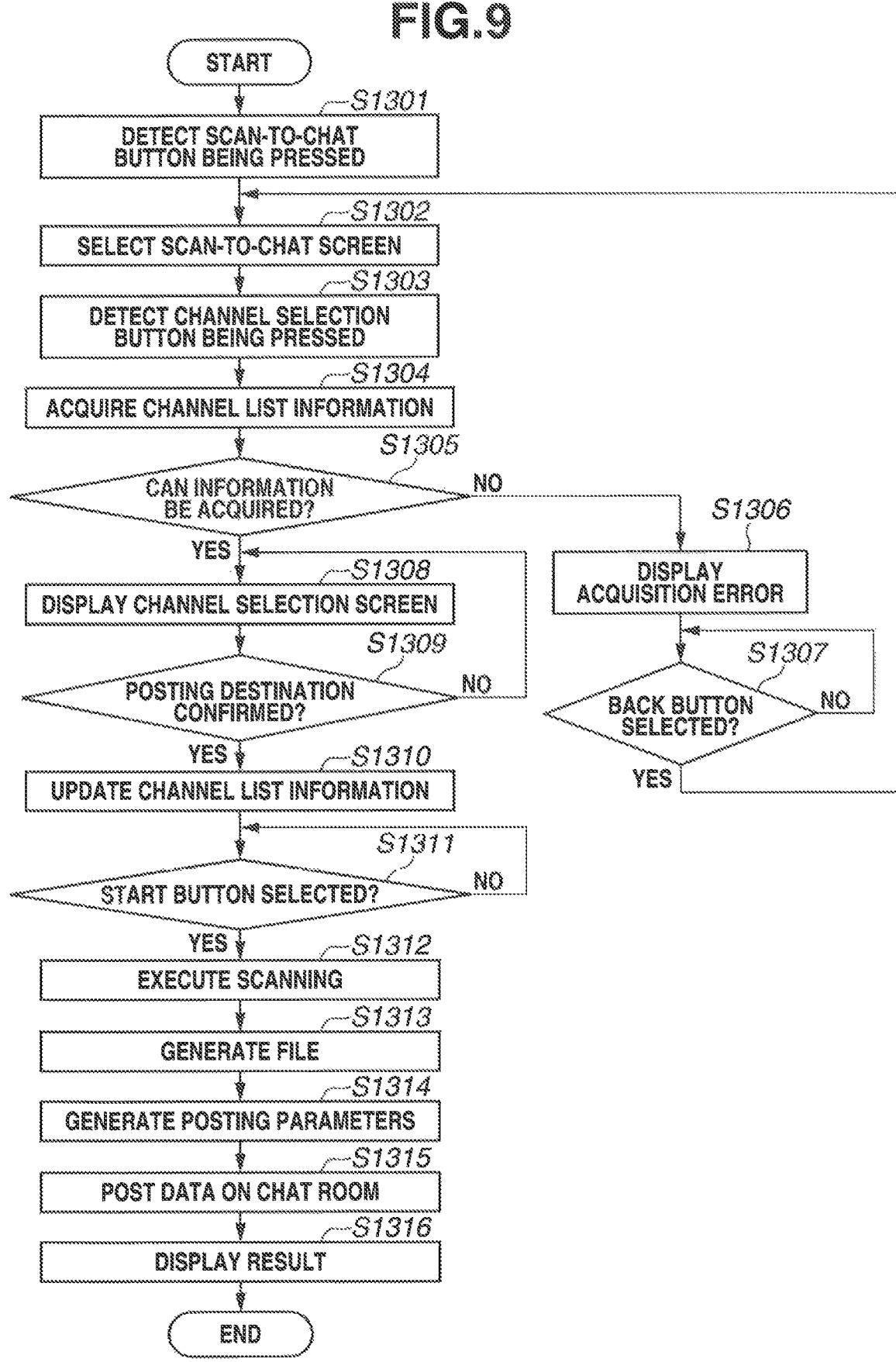
FIG. 9 is a flowchart illustrating an example of the scan-to-chat processing.

FIG. 9 is a flowchart illustrating an example of the scan-to-chat processing. The processing in the flowchart in FIG. 9 is executed by the CPU 111 loading a program stored in the ROM 112 to the RAM 113 and executing the program. The processing procedure illustrated in FIG. 9 is started when the MFP 101 is turned on.

Since processing in steps S1301 to S1303 is similar to the processing in steps S1001 to S1003, a redundant description thereof will be omitted.

In step S1304, the CPU 111 of the MFP 101 acquires the user ID of the user who has logged in to the MFP 101 or the device ID of the MFP 101, and transmits a request for acquiring the channel list information and the user ID or the device ID to the bot server 400 using the HTTP communication.

Processing in steps S1305 to S1314 is similar to the processing in steps S1005 to S1014, a redundant description thereof will be omitted.

In step S1315, the CPU 111 transmits the user ID of the user who has logged in to the MFP 101 or the device ID of the MFP 101, and the file and the posting parameters generated in step S1313. While, according to the first exemplary embodiment, the description has been given of the example in which the CPU 111 transmits the file to the message application server 300 using the token information 1503 registered in advance, a method is not limited thereto. For example, the storage 114 of the MFP 101 may store the user ID or the device ID and the token information illustrated in FIG. 16 in correspondence with each other, and the CPU 111 may transmit the request and the file using the token information corresponding to the user ID who has logged in or the device ID.

While, according to the present exemplary embodiment, the user ID who has logged in or the device ID is used for communication with the bot server 400, the ID may be tenant ID as long as only it is a unique identifier.

Figure 10:
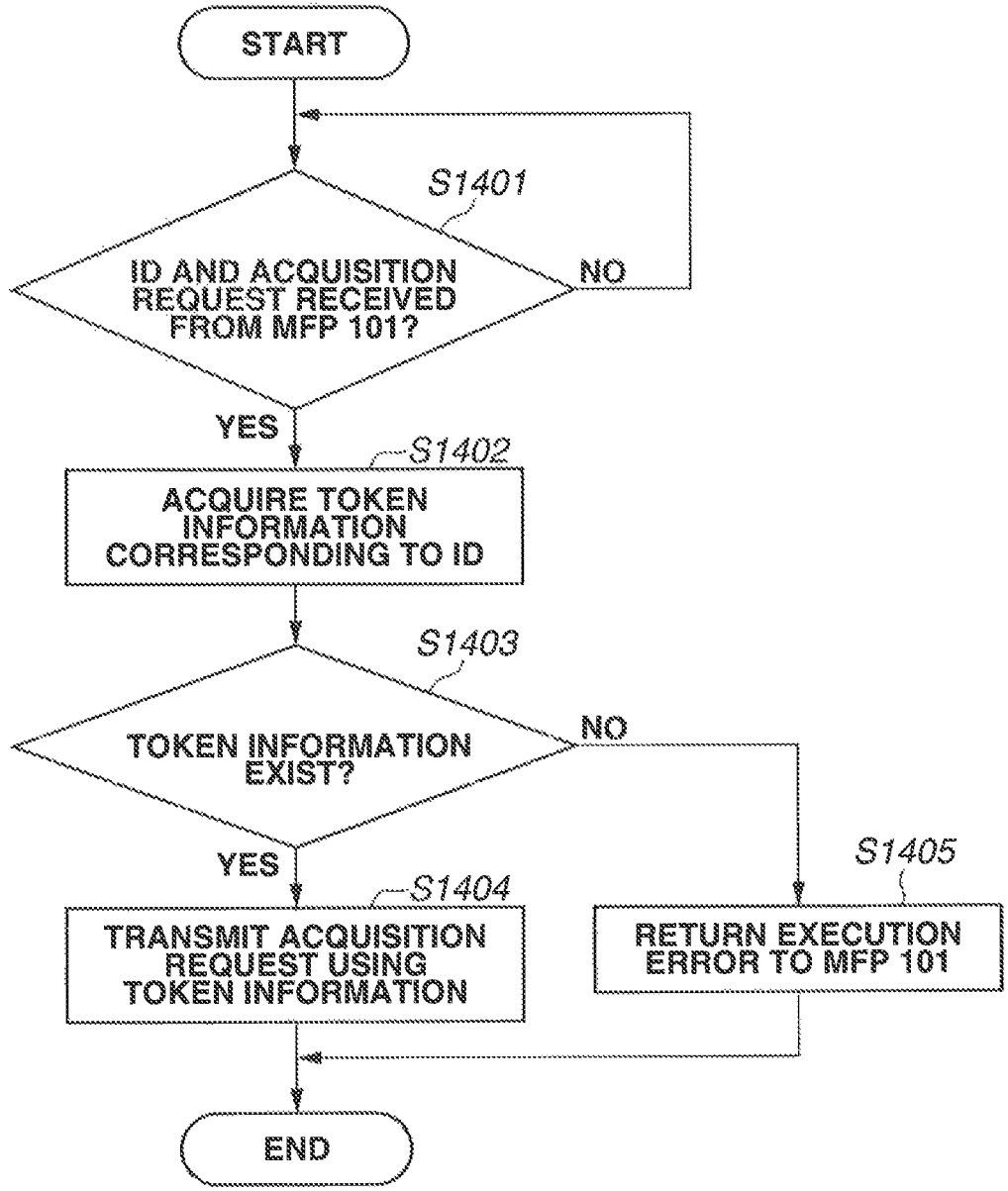
FIG. 10 is a flowchart illustrating an example of processing executed in a case where the bot server 400 transmits image data to the message application server 300.

FIG. 10 is a flowchart illustrating an example of processing in which the bot server 400 transmits image data to the message application server 300. The processing in the flowchart in FIG. 10 is executed by the CPU 401 loading a program stored in the ROM 112 to the RAM 113 and executing the program. The processing procedure illustrated in FIG. 10 is started when the MFP 101 is turned on.

In step S1401, the CPU 401 determines whether the bot server 400 has received the device ID or the user ID and an information acquisition request for acquiring the channel list information. In a case where the CPU 111 determines that the bot server 400 has received the device ID or the user ID and the information acquisition request (YES in step S1401), the processing proceeds to step S1402. In a case where the CPU 111 determines that the bot server 400 has not received the device ID or the user ID and the information acquisition request (NO in step S1401), the processing returns to step S1401.

In step S1402, the CPU 401 acquires the token information corresponding to the device ID or user ID received from the MFP 101.

In step S1403, the CPU 401 determines whether the token information corresponding to the received device ID or user ID exists, using the table illustrated in FIG. 16. In a case where the CPU 401 determines that the token information exists (YES in step S1403), the processing proceeds to step S1404. In a case where the CPU 401 determines that the token information does not exist (NO in step S1403), the processing proceeds to step S1405. In a case where the CPU 401 determines that the token information exists, the RAM 403 stores the token information corresponding to the received device ID or user ID.

In step S1404, the CPU 401 transmits the information acquisition request received from the MFP 101 in step S1401 to the message application server 300 using the token information identified in step S1403. The CPU 401 transmits information, which has been returned from the message application server 300 in response to the transmission of the information acquisition request, to the MFP 101.

In step S1405, the CPU 401 transmits information indicating an execution error to the MFP 101 in response to the request received in step S1401.

The description has been given of the processing procedure illustrated in FIG. 10 using the example of when the user ID or device ID and information acquisition request transmitted in step S1101 in the sequence illustrated in FIG. 8 are received. The CPU 401 also executes processing similar to that illustrated in FIG. 10 when the user ID or device ID, file (image data), and posting destination channel information transmitted in the processing in step S1112 are received. That is, in a case where the token information corresponding to the received device ID or user ID exists, the CPU 401 transmits the token information, the posting destination channel information, and the file (image data) to the message application server 300. In a case where the token information corresponding to the received device ID or user ID does not exist, the CPU 401 transmits information indicating an error to the MFP 101.

According to the present exemplary embodiment, even in a case where an interface specification of the message application server 300 is changed, posting of a file can be achieved only by updating a program of the bot server 400 without uploading a program of the MFP 101. In a workplace where there is a plurality of MFPs, it is possible to post a file without making an individual token setting with respect to each of the MFPs.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-205592, filed Nov. 13, 2019, which is hereby incorporated by reference herein in its entirety.

What is claimed is:

1. An image processing apparatus comprising:
    a scanning unit configured to scan an image of a document sheet and generate image data based on the image;
    a receiving unit configured to receive selection, by a user, of a channel of chat service provided by a chat server from a plurality of channels of the chat service; and
    a transmission unit configured to transmit the image data generated by the scanning unit to the chat server so that the chat server posts the image data to the selected channel.

2. The image processing apparatus according to claim 1, further comprising:
    a communication unit configured to receive group information from the chat server; and
    a display unit configured to display information indicating a channel corresponding to the group information received by the communication unit;
    wherein the receiving unit receives selection, by the user, of the information indicating the channel displayed by the display unit.

3. The image processing apparatus according to claim 2, wherein the display unit is configured to display predetermined screen on which the information indicating the selected channel is set as a destination.

4. The image processing apparatus according to claim 3, wherein the scanning unit scans the image of the document sheet to generate the image data based on an execution instruction input by the user while the predetermined screen is displayed by the display unit.

5. The image processing apparatus according to claim 2,
wherein the transmission unit is configured to transmit information corresponding to an application installed in the chat server to the chat server, and
wherein the communication unit is configured to receive the group information stored in correspondence with the application from the chat server.

6. The image processing apparatus according to claim 5, further comprising:
a storage unit configured to store user-identification information and information corresponding to the application in correspondence with each other,
wherein the transmission unit is configured to transmit the information corresponding to the application in correspondence with the user-identification information of a user who has logged in to the image processing apparatus.

7. The image processing apparatus according to claim 6, wherein the transmission unit is configured to transmit, based on generating the image data by the scanning unit, the generated image data, information indicating the channel, and the information corresponding to the application to the chat server.

8. The image processing apparatus according to claim 6, wherein the transmission unit is configured to transmit, based on generating the image data by the scanning unit, the image data, information indicating the channel, the information corresponding to the application, and information indicating a comment to the chat server.

9. The image processing apparatus according to claim 5, wherein the information corresponding to the application is token information stored in the image processing apparatus in correspondence with the application.

10. The image processing apparatus according to claim 1, wherein the receiving unit is configured to receive selection, by the user, of the channel of the chat service from a plurality of channels of the chat service and receives, by the user, selection of a user to be mentioned from among users included in the selected channel.

11. The image processing apparatus according to claim 1, wherein the transmission unit is configured to transmit, based on generating by the scanning unit the image data, the image data so that the chat server posts the image data to the selected channel.

12. The image processing apparatus according to claim 1, further comprising:
a setting unit configured to set information to communicate with the chat server,
wherein the transmission unit is configured to transmit, by using the information to communicate with the chat server the image data to the chat server so that the chat server posts the image data to the selected channel.

13. The image processing apparatus according to claim 12, wherein the information to communicate with the chat server is a uniform resource locator (URL).

14. The image processing apparatus according to claim 1, wherein the channel of the chat service is a chat room.

15. The image processing apparatus according to claim 1, further comprising a printing unit configured to print an image on a sheet.

16. The image processing apparatus according to claim 1, wherein, in response to receiving a predetermined execution instruction, the scanning unit scans the image of the document sheet and generate image data and then the transmission unit transmits the image data generated by the scanning unit to the chat server.

17. The image processing apparatus according to claim 16, wherein the predetermined execution instruction is selection of a predetermined object.

18. An image processing method comprising:
scanning an image of a document sheet and generating image data based on the image;
receiving selection, by a user, of a channel of chat service provided by the chat server from a plurality of channels of the chat service; and
transmitting the image data generated by the scanning to the chat server so that the chat server posts the image data to the selected channels.

19. A non-transitory computer-readable storage medium storing a program that, when executed by a computer, causes the computer to perform an image processing method, the method comprising:
scanning an image of a document sheet and generating image data based on the image;
receiving selection, by a user, of a channel of chat service provided by the chat server from a plurality of channels of the chat service; and
transmitting the image data generated by the scanning so that the chat server posts the image data to the selected channel.

20. An image processing apparatus comprising:
a scanning unit configured to scan an image of a document sheet and generate image data based on the image;
a receiving unit configured to receive selection, by a user, of a channel of chat service provided by a chat server from a plurality of channels of the chat service; and
a transmission unit configured to transmit the image data generated by the scanning unit and information of the selected channel,
wherein, using the information of the selected channel, the transmitted image data is posted by the chat server to the selected channel.

21. The image processing apparatus according to claim 20, wherein, based on the transmission of the image data and the information of the selected channel, the transmitted image data is posted by the chat server to the selected channel.

22. The image processing apparatus according to claim 20, further comprising:
a communication unit configured to receive group information from the chat server; and
a display unit configured to display information of channel corresponding to the group information received by the communication unit,
wherein the receiving unit receives selection, by the user, of the information of the channel displayed by the display unit.

23. The image processing apparatus according to claim 22, wherein the display unit is configured to display a predetermined screen on which the information of the selected channel is set as a destination.

24. The image processing apparatus according to claim 23, wherein the scanning unit scans the image of the document sheet to generate the image data based on an execution instruction input by the user while the predetermined screen is displayed by the display unit.

25. The image processing apparatus according to claim 20, wherein the transmission unit is configured to transmit, based on generating the image data by the scanning unit, the image data, information indicating the channel and a message, wherein, using the transmitted image data and the transmitted message, the transmitted image data and the transmitted message are posted by the chat server to the selected channel.

26. The image processing apparatus according to claim 20, wherein the channel of the chat service is a chat room.

27. The image processing apparatus according to claim 20, wherein the channel of the chat service is a chat room.

28. The image processing apparatus according to claim 20, further comprising
a printing unit configured to print an image on a sheet.

29. The image processing apparatus according to claim 20, wherein, in response to receiving a predetermined execution instruction, the scanning unit scans the image of the document sheet and generate image data and then the transmission unit transmits the image data generated by the scanning unit to the chat server.

30. The image processing apparatus according to claim 29,
wherein the predetermined execution instruction is selection of a predetermined object.

31. An image processing method comprising:
scanning an image of a document sheet and generating image data based on the image;
receiving selection, by a user, of a channel of chat service provided by the chat server from a plurality of channels of the chat service; and
transmitting the image data generated by the scanning and information of the selected channel,
wherein, using the information of the selected channel, the transmitted image data is posted by the chat server to the selected channel.

32. A non-transitory computer-readable storage medium storing a program that, when executed by a computer, causes the computer to perform an image processing method, the method comprising:
scanning an image of a document sheet and generating image data based on the image;
receiving selection, by a user, of a channel of chat service provided by the chat server from a plurality of channels of the chat service; and
transmitting the image data generated by the scanning and information of the selected channel,
wherein, using the information of the selected channel, the transmitted image data is posted by the chat server to the selected channel.

* * * * *